US008277041B2

(12) United States Patent
Yamamoto

(10) Patent No.: US 8,277,041 B2
(45) Date of Patent: Oct. 2, 2012

(54) INK-JET RECORDING APPARATUS

(75) Inventor: Hideki Yamamoto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 239 days.

(21) Appl. No.: 12/875,410

(22) Filed: Sep. 3, 2010

(65) Prior Publication Data

US 2011/0102530 A1 May 5, 2011

(30) Foreign Application Priority Data

Nov. 4, 2009 (JP) ................................ 2009-252736

(51) Int. Cl.

| | |
|---|---|
| ***B41J 2/01*** | (2006.01) |
| ***B41J 29/38*** | (2006.01) |
| ***B41J 11/00*** | (2006.01) |
| ***H04N 1/23*** | (2006.01) |
| ***H04N 1/29*** | (2006.01) |
| ***G03G 15/14*** | (2006.01) |

(52) U.S. Cl. ............ 347/104; 347/5; 358/300; 399/364; 400/582

(58) Field of Classification Search ........................ None
See application file for complete search history.

(56) References Cited

U.S. PATENT DOCUMENTS

| | | | |
|---|---|---|---|
| 4,591,884 | A | 5/1986 | Miyamoto et al. |
| 4,972,236 | A | 11/1990 | Hasegawa |
| 5,117,244 | A | 5/1992 | Yu |
| 5,208,640 | A | 5/1993 | Horie et al. |
| 2005/0099480 | A1 | 5/2005 | Saito et al. |
| 2008/0211863 | A1 | 9/2008 | Chikamoto |
| 2011/0050778 | A1 | 3/2011 | Kaiho et al. |

FOREIGN PATENT DOCUMENTS

| | | | |
|---|---|---|---|
| JP | H09-085959 | A | 3/1997 |
| JP | 2000-112197 | A | 4/2000 |
| JP | 2002-210938 | A | 7/2002 |
| JP | 2004-070152 | A | 3/2004 |
| JP | 2005-161839 | A | 6/2005 |
| JP | 2006-084902 | A | 3/2006 |
| JP | 2006-205551 | A | 8/2006 |
| JP | 2008-213202 | A | 9/2008 |
| JP | 2008-221500 | A | 9/2008 |

(Continued)

OTHER PUBLICATIONS

Japan Patent Office, Notification of Reasons for Refusal for Japanese Patent Application No. 2009-252736, dispatched Aug. 23, 2011.
European Patent Office, European Search Report for European Patent Application No. 10009083.6, dated Dec. 14, 2010.

(Continued)

*Primary Examiner* — Stephen Meier
*Assistant Examiner* — Alexander C Witkowski
(74) *Attorney, Agent, or Firm* — Baker Botts L.L.P.

(57) ABSTRACT

An ink-jet recording apparatus, including: a first recording head and a second recording head each having a plurality of ejection openings from which ink is ejected; a conveying mechanism which defines a conveyance path through which a recording medium is conveyed so as to pass a first position at which the recording medium is opposed to the ejection openings of the first recording head and a second position at which the recording medium is opposed to the ejection openings of the second recording head; and a bypass conveying mechanism which defines a bypass path that is connected to the conveyance path at a position thereof between the first position and the second position, for permitting the recording medium to be conveyed so as to bypass the second position.

15 Claims, 6 Drawing Sheets

FOREIGN PATENT DOCUMENTS

| | | | |
|---|---|---|---|
| JP | 2009-113231 | A | 5/2009 |
| JP | 2009-113329 | A | 5/2009 |
| JP | 2009-184327 | A | 8/2009 |
| JP | 2011-051342 | A | 3/2011 |

OTHER PUBLICATIONS

Japan Patent Office, Decision of Refusal for Japanese Patent Application No. 2009-252736, dispatched Jan. 17, 2012.

Japan Patent Office, Notification of Reasons for Refusal for Japanese Patent Application No. 2011-232721, dispatched Mar. 13, 2012.

INK-JET RECORDING APPARATUS

CROSS REFERENCE TO RELATED APPLICATION

The present application claims priority from Japanese Patent Application No. 2009-252736, which was filed on Nov. 4, 2009, the disclosure of which is herein incorporated by reference in its entirety.

BACKGROUND OF THE INVENTION

1. Field of the Invention

The present invention relates to an ink-jet recording apparatus configured to record or print an image on a recording medium.

2. Discussion of Related Art

There has been known an ink-jet printer having four ink-jet heads for respectively ejecting magenta ink, cyan ink, yellow ink, and black ink and a maintenance unit for performing a maintenance operation on the heads. When the maintenance operation is performed on the ink-jet heads in the thus constructed ink-jet printer, the four ink-jet heads are initially moved upward from a print position to a head maintenance position and the ink is subsequently purged from each of the four ink-jet heads to a tray. Thereafter, the ink adhering to an ejection surface of each head is wiped with a wiper. Thus, the maintenance operation on the ink-jet heads is completed.

SUMMARY OF THE INVENTION

In the above-indicated ink-jet printer, even when a black-and-white monochrome image is printed on a sheet, the sheet passes a position where the sheet is opposed to the heads for color printing. Accordingly, foreign substances such as paper dust swirl or rise in a region near ejection surfaces, e.g., near nozzles, of the heads for color printing which do not contribute to the monochrome printing, so that the foreign substances tend to adhere to the nozzles. Therefore, all of the heads need to be subjected to the maintenance operation, undesirably causing a problem that an amount of the ink consumed in the maintenance operation cannot be reduced.

It is therefore an object of the invention to provide an ink-jet recording apparatus in which foreign substances do not tend to adhere to a recording head.

The above-indicated object may be attained according to a principle of the invention, which provides an ink-jet recording apparatus, comprising:

- a first recording head and a second recording head each having a plurality of ejection openings from which ink is ejected;
- a conveying mechanism which defines a conveyance path through which a recording medium is conveyed so as to pass a first position at which the recording medium is opposed to the ejection openings of the first recording head and a second position at which the recording medium is opposed to the ejection openings of the second recording head; and
- a bypass conveying mechanism which defines a bypass path that is connected to the conveyance path at a position thereof between the first position and the second position, for permitting the recording medium to be conveyed so as to bypass the second position.

BRIEF DESCRIPTION OF THE DRAWINGS

The above and other objects, features, advantages and technical and industrial significance of the present invention will be better understood by reading the following detailed description of preferred embodiments of the invention, when considered in connection with the accompanying drawings, in which:

FIGS. 3A and 3B are partial side views of the ink-jet printer shown in FIG. 1, FIG. 3A showing a state in which the four ink-jet heads are not capped by the maintenance unit while FIG. 3B shows a state in which the four ink-jet heads are capped by the maintenance unit;

DETAILED DESCRIPTION OF THE PREFERRED EMBODIMENTS

There will be hereinafter described preferred embodiments of the invention with reference to the drawings.

First Embodiment

Figure 1:
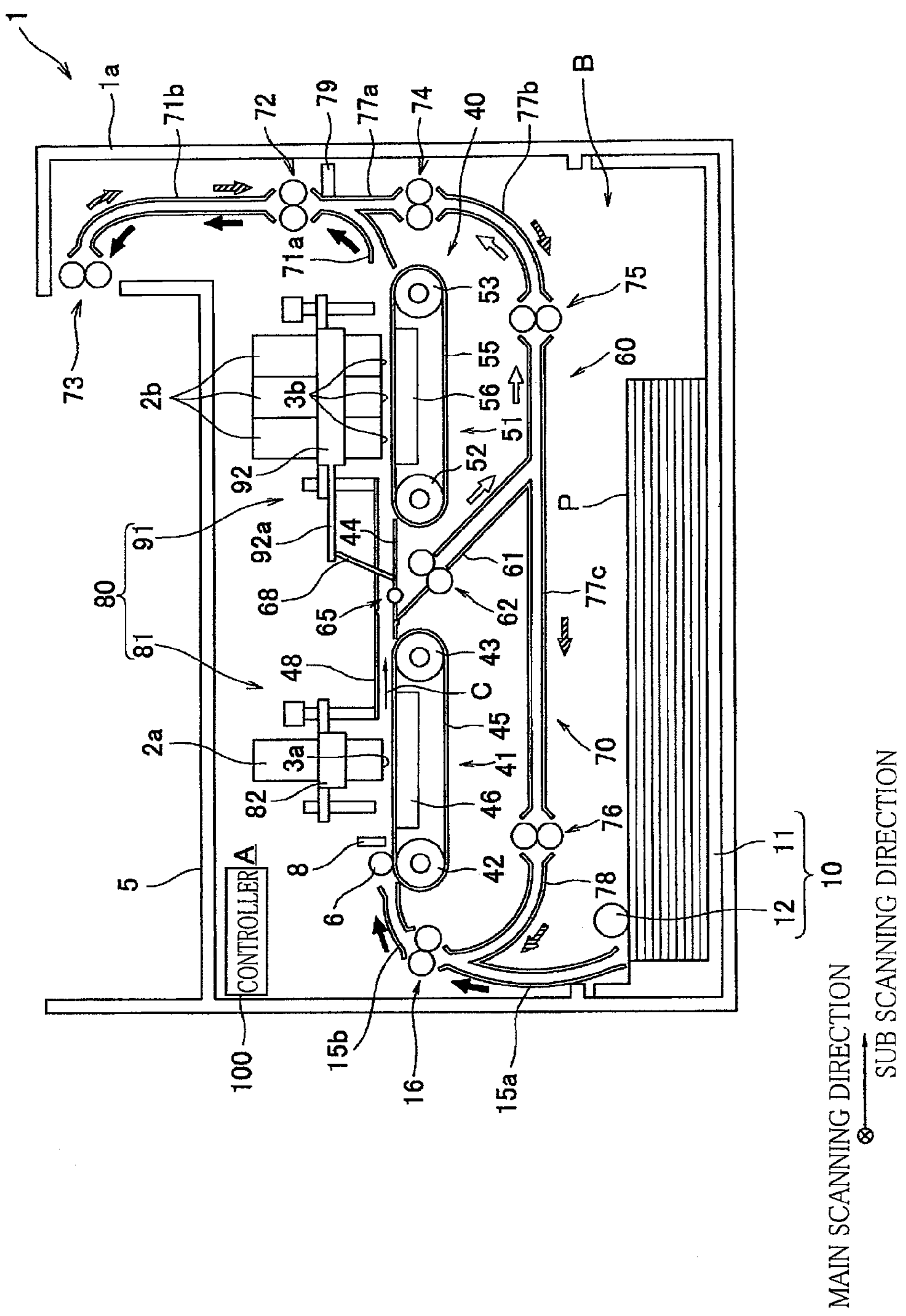
FIG. 1 is a side view in cross section schematically showing an internal structure of an ink-jet printer according to a first embodiment of the invention.

As shown in FIG. 1, an ink-jet printer 1, as an ink-jet recording apparatus, constructed according to a first embodiment of the invention has a casing 1*a* having a rectangular parallelepiped shape. A discharged-sheet receiving portion 5 as a discharged-medium receiving portion is provided at an upper portion of the casing 1*a*. An inside of the casing 1*a* is divided into two spaces A and B which are arranged in order in a direction from the upper portion toward the lower portion of the casing 1*a*. In the space A, there are disposed an ink-jet head 2*a* (as a first recording head) configured to eject black ink for black-and-white monochrome printing: and three ink-jet heads 2*b* (each as a second recording head) for color printing configured to eject magenta ink, cyan ink, and yellow ink, respectively. The head 2*a* and the heads 2*b* are arranged side by side in a sub scanning direction. In the space A, there are further disposed in order: a conveying mechanism 40; and a bypass conveying mechanism 60 and a return mechanism 70, below the heads 2*a*, 2*b*. The return mechanism 70 functions as a reverse conveying mechanism. In the space B, a sheet supply unit 10 as a medium supply portion is disposed. The ink-jet printer 1 further has a controller 100 for controlling operations of various portions.

Figure 2:
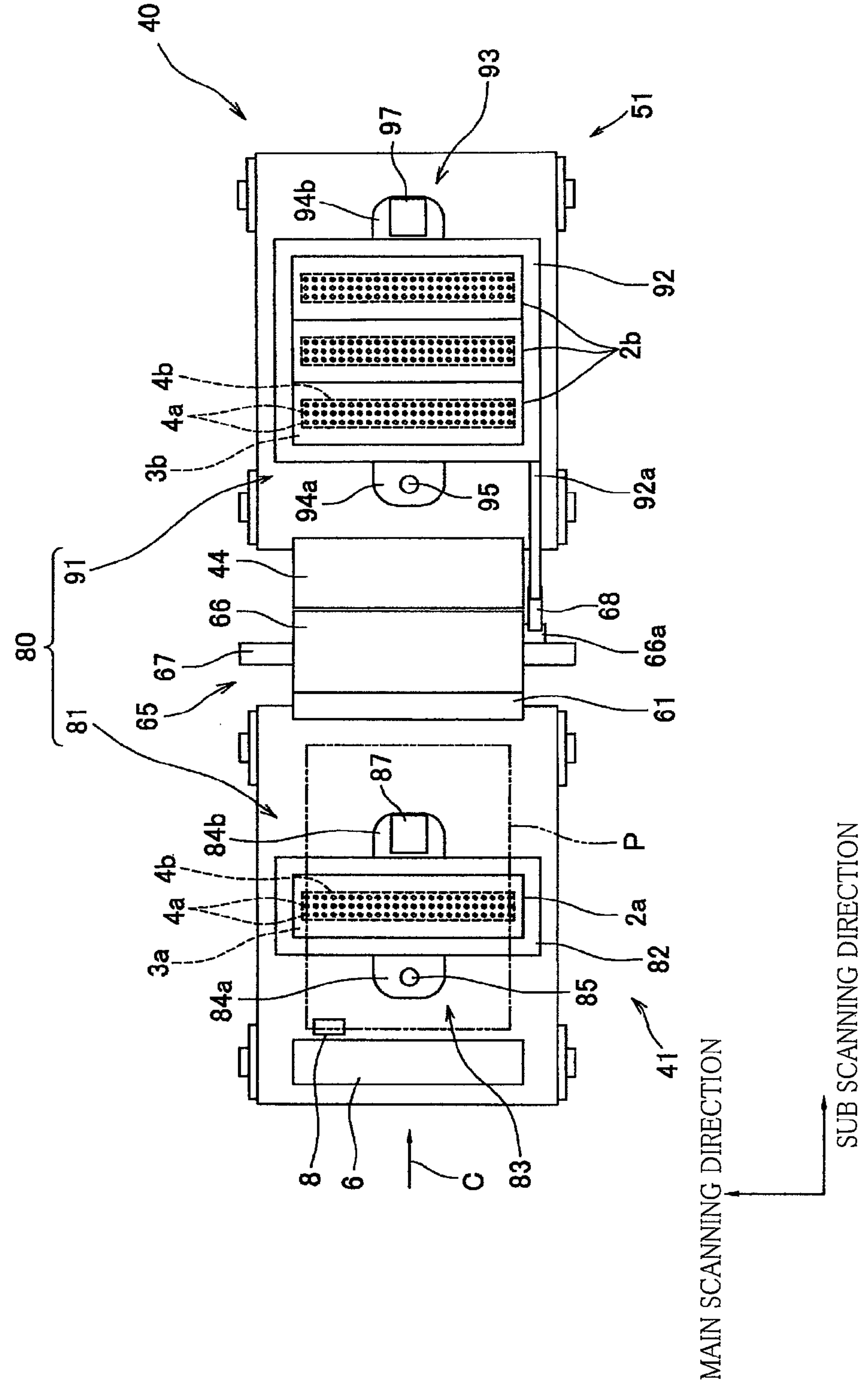
FIG. 2 is a plan view of four ink-jet heads, a conveying mechanism, and a maintenance unit shown in FIG. 1.

As shown in FIGS. 1 and 2, each of the four ink-jet heads 2*a*, 2*b* has a generally rectangular parallelepiped shape that is long in a main scanning direction. That is, the ink-jet printer 1 is a line-type printer. In the present embodiment, the sub scanning direction is a direction parallel to a sheet conveyance direction C (as a medium conveyance direction) in which a sheet P as a recording medium is conveyed while the main scanning direction is a direction orthogonal to the sub scanning direction and is parallel to the horizontal plane.

Each of the heads 2*a*, 2*b* has a stacked body including: a flow-passage unit (not shown) in which are formed ink channels including pressure chambers; and an actuator (not shown) for giving a pressure to the ink in the pressure chambers. The bottom surface of the head 2*a* functions as an ejection surface 3*a* from which the ink is ejected. Similarly, the bottom surfaces of each of the heads 2*b* functions as an ejection surface 3*b* from which the ink is ejected. In each of the ejection surfaces 3*a*, 3*b*, there is formed an ejection region 4*b* that contain a plurality of ejection openings (nozzles) 4*a* through which the ink is ejected. The ejection region 4*b* has a dimension as measured in the main scanning direction that is slightly larger than a dimension of the sheet P as measured in the same direction. Accordingly, the ink-jet printer 1 is capable of forming an image over the entire surface of the sheet P, namely, the ink-jet printer 1 is capable of performing marginless printing.

There are formed, in the inside of the ink-jet printer 1, a print path, a return path, and a bypass path which is used in monochrome printing. The print path is a path through which the sheet P is conveyed along bold arrows (black solid arrows) indicated in FIG. 1. More specifically, the print path is a path extending from the sheet supply unit 10 toward the discharged-sheet receiving portion 5 via a conveyance path that is defined by the conveying mechanism 40. Here, the conveyance path is a path located between the four ink-jet heads 2*a*, 2*b* and the conveying mechanism 40 and extending generally linearly in the sub scanning direction. The bypass path is a path defined by the bypass conveying mechanism 60. More specifically, the bypass path is a path which branches from the conveyance path at a substantially middle position thereof, namely, at a position of the conveyance path between a first position and a second position (which will be described), so as to bypass a position (i.e., the second position) where the sheet P is opposed to the ink-jet heads 2*b* for color printing, and which finally merges with a downstream portion of the conveyance path, as indicated by bold arrows (white open arrows) shown in FIG. 1. The return path is a path through which the sheet P that has been conveyed through the conveyance path or the bypass path is conveyed along bold arrows (hatched arrows) indicated in FIG. 1.

The sheet supply unit 10 has a sheet cassette 11 in which a stack of the sheets P can be accommodated, a sheet supply roller 12 configured to feed an uppermost one of the sheets P from the sheet cassette 11, and a sheet supply motor (not shown) controlled by the controller 100 and configured to rotate the sheet supply roller 12.

The sheet supply roller 12 is configured to come into rolling contact with the uppermost one of the sheets P accommodated in the sheet cassette 11, thereby feeding the uppermost sheet from the sheet supply cassette 11. On the left side of the conveying mechanism 40 as seen in FIG. 1, there are provided: sheet guides 15*a*, 15*b* that extend from the sheet cassette 11 toward the conveying mechanism 40 in a curved form; and feed roller pair 16 disposed between the sheet guide 15*a* and the sheet guide 15*b* on an upstream side of the conveying mechanism 40. The sheet guides 15*a*, 15*b* and the feed roller pair 16 define a sheet supply path extending from the sheet supply unit 10 and connected to an upstream portion of the above-indicated conveyance path. Here, one of two rollers of the feed roller pair 16 is configured to rotate by a feed motor (not shown) controlled by the controller 100 while the other roller is a driven roller configured to rotate in accordance with the rotation of the one roller. Further, the rollers of the feed roller pair 16 function as register rollers for correcting skew of the sheet P when the sheet P is sent to the conveying mechanism 40.

In the structure described above, when the sheet supply roller 12 and the rollers of the feed roller pair 16 rotate under the control of the controller 100, the sheet P is supplied to the sheet guide 15*a* and is subsequently sent to the conveying mechanism 40 through the sheet guide 15*b* while being prevented from skewing by being held by the feed roller pair 16.

As shown in FIGS. 1 and 2, the conveying mechanism 40 defines the above-indicated conveyance path through which the sheet P is conveyed so as to pass the first position at which the sheet P is opposed to the ink-jet head 2*a* and the second position at which the sheet P is opposed to the ink-jet heads 2*b*. The conveying mechanism 40 is configured to convey the sheet P through the conveyance path in the sheet conveyance direction indicated by an arrow C in FIG. 1. The conveying mechanism 40 includes: a first unit 41 disposed at a position where the first unit 41 is opposed to the ink-jet head 2*a* for monochrome printing; a second unit 51 disposed at a position where the second unit 51 is opposed to the ink-jet heads 2*b* for color printing; a plate-like guide member 48 disposed between the heads 2*a*, 2*b* so as to bridge the first and second units 41, 51; and a guide member 44 disposed between the first and second units 41, 51 so as to be parallel to the guide member 48. The first unit 41 and the second unit 51 are disposed such that the position where the first unit 41 is opposed to the head 2*a* in the conveyance path and the position where the second unit 51 is opposed to the heads 2*b* in the conveyance path are located so as to be arranged horizontally along the sheet conveyance direction C. In FIG. 2, the guide member 48 is not illustrated for the sake of clarity.

The first unit 41 includes: two belt rollers 42, 43; an endless conveyor belt 45 wound around the two rollers 42, 43 so as to be stretched therebetween; an adsorption platen 46 supporting the upper loop portion of the conveyor belt 45 from the inside of the loop; a conveyance motor (not shown) configured to rotate the belt roller 43; and a power source (not shown) configured to apply a voltage to the adsorption platen 46. The conveyance motor and the power source are both controlled by the controller 100.

The adsorption platen 46 has a pair of comb electrodes (not shown) each having a comb-like shape and including a plurality of extending portions which are elongate in the sheet conveyance direction C. Each of the extending portions of one of the two comb electrodes and each of the extending portions of the other of the two comb electrodes are alternately arranged in the main scanning direction. The adsorption platen 46 is configured such that the sheet P is adsorbed or attracted onto the conveyor belt 45 by application of the voltage to the electrodes.

Like the first unit 41, the second unit 51 includes: two belt rollers 52, 53; an endless conveyor belt 55 wound around the two rollers 52, 53 so as to be stretched therebetween; an adsorption platen 56 supporting the upper loop portion of the conveyor belt 55 from the inside of the loop; a conveyance motor (not shown) configured to rotate the belt roller 53; and a power source (not shown) configured to apply a voltage to the adsorption platen 56. The conveyance motor and the power source are both controlled by the controller 100. The adsorption platen 56 has a structure similar to that of the adsorption platen 46 and is configured such that the sheet P is adsorbed or attracted onto the conveyor belt 55 by application of the voltage to a pair of comb electrodes thereof.

The bypass conveying mechanism 60 is disposed around the second unit 51. The bypass conveying mechanism 60 includes a sheet guide 61, a feed roller pair 62 disposed in the middle of the sheet guide 61, a part of a sheet guide 77*c* of the return mechanism 70, sheet guides 77*a*, 77*b*, and feed roller pairs 74, 75. The bypass conveying mechanism 60 defines the above-indicated bypass path. That is, the bypass conveying mechanism 60 and the return mechanism 70 utilize a part of the constituent components thereof in common. In other words, a part of the bypass path defined by the bypass conveying mechanism 60 and a part of the return path defined by the return mechanism 70 are common to each other. Accordingly, the structures of those mechanisms 60, 70 are simplified. The sheet guide 61 extends, from a position of the conveyance path located between the first and second units 41, 51, obliquely to the lower right in FIG. 1 and merges with the sheet guide 77*c*. One of two rollers of each of the feed roller pairs 62, 74, 75 is configured to rotate by a conveyance motor (not shown) controlled by the controller 100 while the other roller of each roller pair is a driven roller configured to rotate in accordance with the rotation of the one roller.

As shown in FIGS. 1 and 2, a pressing roller 6 is disposed so as to be opposed to the belt roller 42 with the conveyor belt 45 interposed therebetween. The pressing roller 6 is configured to press the sheet P supplied from the sheet supply unit 10 onto a conveyor surface of the conveyor belt 45. A sheet sensor 8 is disposed between the pressing roller 6 and the ink-jet head 2*a* for detecting the leading end of the sheet P that is pressed by the pressing roller 6.

In the structure described above, when the belt rollers 43, 53 are rotated clockwise in FIG. 1 under the control of the controller 100, the conveyor belts 45, 55 are rotated. On this occasion, the belt rollers 42, 52 and the pressing roller 6 are also rotated by the rotary movement of the conveyor belts 45, 55. Further, on this occasion, mutually different potentials are given to the respective comb electrodes of each of the adsorption platens 46, 56 under the control of the controller 100, whereby there is generated positive or negative electric charge at portions of the respective conveyor belts 45, 55 that are opposed to the sheet P while there is induced, at portions of the sheet P that are opposed to the respective conveyor belts 45, 55, electric charge whose polarity is opposite to that of the above-indicated positive or negative electric charge. As a result, the electric charge generated at the portions of the conveyor belts 45, 55 and the electric charge induced at the portions of the sheet P are attracted to each other, so that the sheet P is adsorbed or attracted onto the conveyor belts 45, 55. Thus, the sheet P supplied from the sheet supply unit 10 is conveyed in the sheet conveyance direction C while being adsorbed or attracted initially to the conveyor belt 45. Subsequently, the sheet P passes between the guide members 48, 44, and is further conveyed in the sheet conveyance direction C while being adsorbed or attracted onto the conveyor belt 55. When the sheet P that has been conveyed while being adsorbed or attracted to the conveyor belts 45, 55 passes right below the ink-jet heads 2*a*, 2*b*, the controller 100 controls the ink-jet heads 2*a*, 2*b* to respectively eject the ink of the different colors toward the sheet P. Thus, a desired color image is formed on the sheet P.

In the meantime, when the controller 100 controls the rollers of each of the feed roller pairs 62, 74, 75 to rotate and controls a path changing mechanism 65 (which will be explained) to operate so as to guide the sheet P conveyed by the first unit 41 to the sheet guide 61, the sheet P is conveyed from the substantially middle position of the conveyance path to the bypass path. In this instance, since the sheet P does not pass the position where the sheet P is opposed to the ink-jet heads 2*b* for color printing, only a desired monochrome image is formed on the sheet P.

As shown in FIG. 1, there are disposed, on the right side of the ink-jet heads 2*b*, sheet guides 71*a*, 71*b* and feed roller pairs 72, 73 each as a component of the return mechanism 70. The sheet guides 71, 71*b* extends, in a curved form, from the conveying mechanism 40 toward the discharged-sheet receiving portion 5. The sheet guides 71*a*, 71*b* and the two feed roller pairs 72, 73 partly define the return path and the bypass path. One of two rollers of each of the feed roller pairs 72, 73 is configured to rotate by a feed motor (not shown) controlled by the controller 100 while the other roller of each roller pair is a driven roller configured to rotate in accordance with the rotation of the one roller. A sheet sensor 79 is provided in the vicinity of the feed roller pair 72. The sheet sensor 79 is configured to detect the trailing end of the sheet P conveyed from the conveying mechanism 40.

In the structure described above, when the rollers of each of the roller pairs 72, 73 rotate in respective predetermined rotational directions under the control of the controller 100, the sheet P conveyed from the conveying mechanism 40 or the bypass conveying mechanism 60 passes through the sheet guides 71*a*, 71*b* so as to be sent upward in FIG. 1 while being held by the rollers of each roller pair 72, 73 and is subsequently discharged to the discharged-sheet receiving portion 5. On this occasion, where the sheet P is not discharged to the discharged-sheet receiving portion 5 and an image is formed on the back surface of the sheet P, namely, on the back surface of the sheet P having the front surface on which the color image or the monochrome image has been formed, the rollers of each feed roller pair 72, 73 are rotated under the control of the controller 100 in respective reverse rotational directions opposite to the above-indicated predetermined rotational directions at a time when the trailing end of the sheet P reaches near the feed roller pair 72. Thus, the sheet P is conveyed in a reverse direction (in the downward direction in FIG. 1) away from the discharged-sheet receiving portion 5. More specifically, the reverse direction is opposite to the direction in which the sheet P has been conveyed from the conveying mechanism 40 or the bypass conveying mechanism 60.

As shown in FIG. 1, the return mechanism 70 includes, in addition to the above-indicated sheet guides 71*a*, 71*b* and two feed roller pairs 72, 73, three feed roller pairs 74-76, the sheet guide 77*a* disposed between the feed roller pairs 72, 74, the sheet guide 77*b* disposed between the feed roller pairs 74, 75, the sheet guide 77*c* disposed between the feed roller pairs 75, 76, a sheet guide 78 which is disposed between the feed roller pair 76 and the feed roller pair 16 and which merges with the sheet guide 15*a*. One of two rollers of the feed roller pair 76 is configured to rotate by a feed motor (not shown) controlled by the controller 100 while the other roller of the feed roller pair 76 is a driven roller configured to rotate in accordance with the rotation of the one roller. A part of the sheet guide 77*c*, the sheet guides 77*a*, 77*b*, and the feed roller pairs 74, 75 are also used as components of the above-indicated bypass conveying mechanism 60.

In the structure described above, when the rollers of each of the feed roller pairs 74-76 rotate under the control of the controller 100, the sheet P conveyed in the above-indicated reverse direction away from the discharged-sheet receiving portion 5 passes through the sheet guides 77*a*-77*c*, 78 while being held by the rollers of each of the feed roller pairs 74-76, and is conveyed to the feed roller pair 16. Subsequently, the rollers of the feed roller pair 16 rotate under the control of the controller 100, whereby the sheet P having the front surface on which the image has been formed is conveyed to the upstream side of the conveying mechanism 40 in the sheet conveyance direction C, namely, to the sheet supply path. In this instance, the sheet P is conveyed to the conveying mechanism 40 in a state in which one surface thereof which faced upward when fed to the conveying mechanism 40 from the sheet supply unit 10 faces downward. That is, the sheet P is turned over.

As shown in FIGS. 1 and 2, there is provided, in the printer 1, a maintenance unit 80 for performing maintenance of the ink-jet heads 2*a*, 2*b*. The maintenance unit 80 includes a first capping mechanism 81 for restraining thickening of the ink in the neighborhood of the ejection openings 4*a* of the ink-jet head 2*a* for monochrome printing and a second capping mechanism 91 for restraining thickening of the ink in the neighborhood of the ejection openings 4*a* of the ink-jet heads 2*b* for color printing. The maintenance unit 80 further includes a cleaning member for cleaning the conveyor belts 45, 55 to remove the ink adhering thereto and a wiper mechanism for wiping the ejection surfaces 3*a*, 3*b* to remove the ink adhering thereto. The cleaning member and the wiper mechanism are both not illustrated.

Figure 3A:
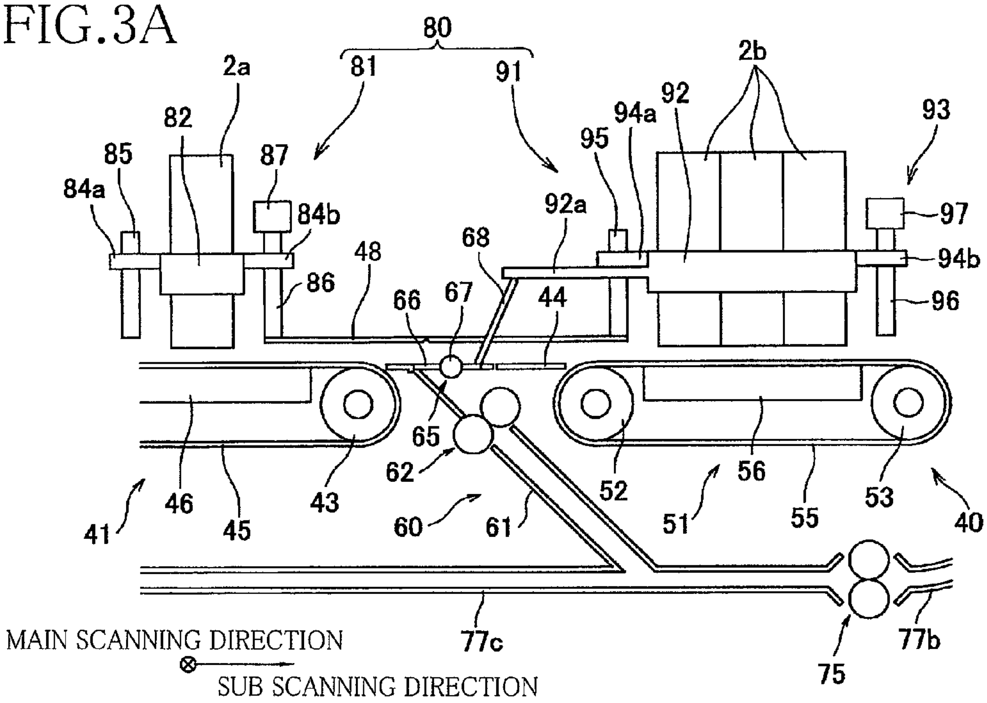
Figure 3B:
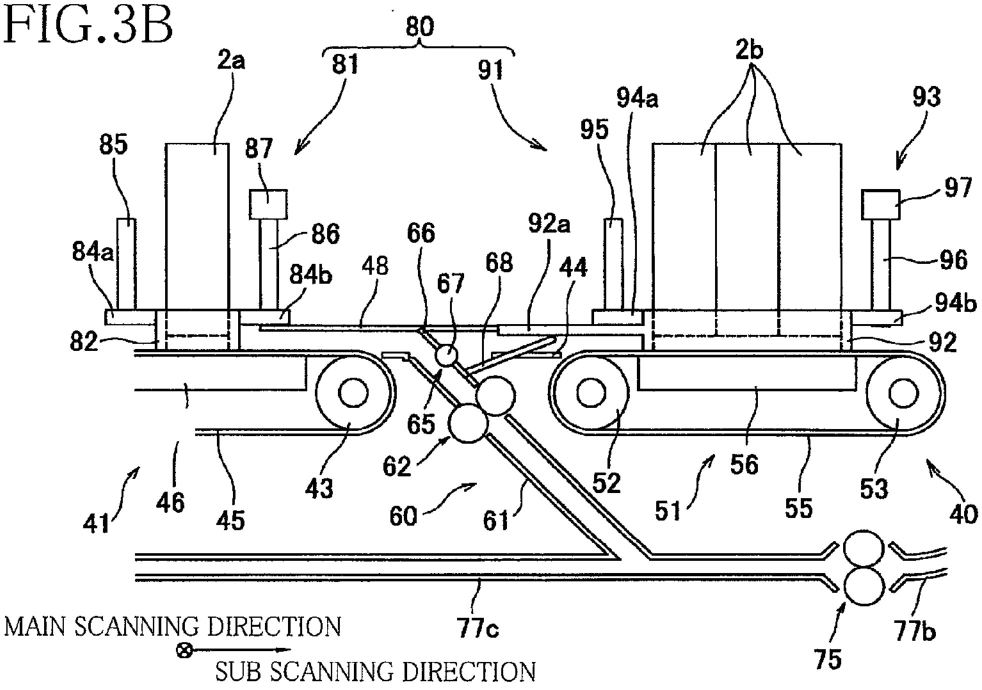

As shown in FIGS. 2 and 3, the first capping mechanism 81 includes a first sleeve 82 disposed around or fitted on the ink-jet head 2*a* so as to surround the head 2*a* and a first moving mechanism 83 configured to move the first sleeve 82 in the up-down direction. The first sleeve 82 surrounds or encloses the ink-jet head 2*a* and is held in close contact with the outer surface of the ink-jet head 2*a* only at the vicinity of the upper end of its inner surface. The lower end portion of the first sleeve 82 is formed of an elastic member such as rubber.

The first moving mechanism 83 includes two flanges 84*a*, 84*b* fixed to the outer surface of the first sleeve 82, a guide 85 which slidably supports the flange 84*a*, a shaft 86 whose outer circumferential surface is externally threaded, and a motor 87 controlled by the controller 100 and configured to rotate the shaft 86. The guide 85 is fixed to the casing 1*a* and is inserted through a hole formed at the center of the flange 84*a*. The shaft 86 is screwed into an internally threaded screw hole formed at the center of the flange 84*b*.

In the structure described above, when the shaft 86 rotates in a forward direction under the control of the controller 100, the first sleeve 82 moves from a retracted position (shown in FIG. 3A) at which the first sleeve 82 is spaced apart from the conveyor belt 45 to a contact position (shown in FIG. 3B) at which the first sleeve 82 is held in close contact with the conveyor belt 45 at its lower end. The retracted position is a position at which a hermetically closed space that is partly defined by the ejection surface 3*a* is not formed, namely, the hermetically closed space is not formed at the front of the ejection surface 3*a*. More specifically, the retracted position is a position at which the hermetically closed space defined by the ejection surface 3*a*, the first sleeve 82, and the conveyor belt 45 is not formed. On the other hand, the contact position is a position at which the hermetically closed space that is partly defined by the ejection surface 3*a* is formed, namely, the hermetically closed space is formed at the front of the ejection surface 3*a*. More specifically, the contact position is a position at which the hermetically closed space defined by the ejection surface 3*a*, the first sleeve 82, and the conveyor belt 45 is formed. In this instance, since the upper end of the first sleeve 82 and the outer surface of the ink-jet head 2*a* are held in close contact with each other, a space enclosed by the ejection surface 3*a*, the conveyor belt 45, and the first sleeve 82, namely, an external space communicating with the ejection openings 4*a*, becomes the hermetically closed space. In other words, the ink-jet head 2*a* can be capped utilizing the first sleeve 82. In this way, is possible to restrain the thickening of the ink in the neighborhood of the ejection openings 4*a* of the ink-jet head 2*a*. On the other hand, when the shaft 86 rotates in a reverse direction under the control of the controller 100, the first sleeve 82 moves from the contact position to the retracted position.

As shown in FIGS. 2 and 3, the second capping mechanism 91 includes a second sleeve 92 disposed around the three ink-jet heads 2*b* so as to surround the heads 2*b* and a second moving mechanism 93 configured to move the second sleeve 92 in the up-down direction. The second sleeve 92 surrounds or encloses the three ink-jet heads 2*b* and is held in close contact with the outer surface formed by the three ink-jet heads 2*b* at the upper end of its inner surface. The lower end portion of the second sleeve 92 is formed of an elastic member such as rubber. A protruding portion 92*a* that protrudes in the sub scanning direction is formed at a lower left corner of the second sleeve 92 as seen in FIG. 2.

The second moving mechanism 93 includes two flanges 94*a*, 94*b* fixed to the outer surface of the second sleeve 92, a guide 95 which slidably supports the flange 94*a*, a shaft 96 whose outer circumferential surface is externally threaded, and a motor 97 controlled by the controller 100 and configured to rotate the shaft 96. The guide 95 is fixed to the casing 1*a* and is inserted through a hole formed at the center of the flange 94*a*. The shaft 96 is screwed into an internally threaded screw hole formed at the center of the flange 94*b*.

In the structure described above, when the shaft 96 rotates in a forward direction under the control of the controller 100, the second sleeve 92 moves from a retraced position (shown in FIG. 3A) at which the second sleeve 92 is spaced apart from the conveyor belt 55 to a contact position (shown in FIG. 3B) at which the second sleeve 92 is held in close contact with the conveyor belt 55 at its lower end. The retracted position is a position at which a hermetically closed space that is partly defined by the three ejection surfaces 3*b* is not formed, namely, the hermetically closed space is not formed at the front of the ejection surfaces 3*b*. More specifically, the retracted position is a position at which the hermetically closed space defined by the three ejection surfaces 3*b*, the second sleeve 92, and the conveyor belt 55 is not formed. On the other hand, the contact position is a position at which the hermetically closed space that is partly defined by the three ejection surfaces 3*b* is formed, namely, the hermetically closed space is formed at the front of the ejection surfaces 3*b*. More specifically, the contact position is a position at which the hermetically closed space defined by the three ejection surfaces 3*b*, the second sleeve 92, and the conveyor belt 55 is formed. In this instance, since the upper end of the second sleeve 92 and the outer surface of the ink-jet heads 2*b* are held in close contact with each other, a space enclosed by the three ejection surfaces 3*b*, the conveyor belt 55, and the second sleeve 92, namely, an external space communicating with the ejection openings 4*a*, becomes the hermetically closed space. In other words, the ink-jet heads 2*b* can be capped utilizing the second sleeve 92. In this way, is possible to restrain the thickening of the ink in the neighborhood of the ejection openings 4*a* of the ink-jet heads 2*b*. On the other hand, when the shaft 96 rotates in a reverse direction under the control of the controller 100, the second sleeve 92 moves from the contact position to the retracted position.

In the structure described above, the second capping mechanism 91 is configured to selectively establish: a state in which the hermetically closed space is formed at the front of the ejection surfaces 3*b* of the three ink-jet heads 2*b*; and a state in which the hermetically closed space is not formed. The second capping mechanism 91 is configured to cap the three ink-jet heads 2*b* in the state in which the hermetically closed space is formed.

Between the first unit 41 and the second unit 51 and in the neighborhood of the upper end of the sheet guide 61, the path changing mechanism 65 is disposed. The path changing mechanism 65 is configured to permit the sheet P to be conveyed to one of the conveyance path and the bypass path in association with the movement of the second sleeve 92. As shown in FIGS. 2 and 3, the path changing mechanism 65 includes a plate-like guide member 66 disposed between the upper end of the sheet guide 61 and the guide member 44, two rotational shafts 67 fixed to respective opposite ends of the guide member 66 in the main scanning direction, and a lever 68. One end of each rotational shaft 67 is rotatably supported by the casing 1*a*.

As shown in FIG. 2, the lever 68 is fixed to a protruding portion 66*a* formed at one of the opposite ends of the guide member 66 in the main scanning direction, namely, formed at the lower end of the guide member 66 as seen in FIG. 2. The lever 68 extends from the protruding portion 66*a* obliquely to the upper right in FIG. 3A such that the upper end of the lever 68 is in contact with the protruding portion 92*a* of the second sleeve 92 at a time when the second sleeve 92 is in the retracted position.

In the structure described above, when the second sleeve 92 moves from the retracted position to the contact position, the lever 68 swings downward and the guide member 66 that was kept in a horizontal posture becomes inclined. That is, the guide member 66 is inclined so as to permit the sheet P to be conveyed from the substantially middle position of the conveyance path to the bypass path, such that the sheet P bypasses the second position at which the sheet P is opposed to the ink-jet heads 2*b* for color printing. In other words, when the path changing mechanism 65 permits the sheet P to pass through the bypass path, the second sleeve 92 is located at the contact position. On the other hand, when the second sleeve 92 moves from the contact position to the retracted position, the lever 68 swings upward and the guide member 66 that was kept in the inclined posture becomes horizontal. Accordingly, the sheet P is permitted to pass the second position at which the sheet P is opposed to the ink-jet heads 2*b* for color printing, without passing through the bypass path.

There will be next explained a duplex or double-sided color printing operation and a duplex or double-sided monochrome printing operation performed by the printer 1. It is noted that a color or monochrome printing operation on one side of the sheet P (i.e., a single-sided printing operation) will not be explained since such a single-sided printing operation differs from the duplex printing operation only in that the sheet P is directly discharged to the discharged-sheet receiving portion 5 after an image has been formed on one side of the sheet P.

When print data for forming color images on both sides (i.e., both of front and back surfaces) of the sheet P is sent from a personal computer (PC) or the like to the controller 100, the controller 100 controls the sheet supply unit 10 and the feed roller pair 16 to supply the sheet P from the sheet cassette 11 to the conveying mechanism 40 through the sheet guides 15*a*, 15*b*.

The controller 100 then controls the conveying mechanism 40 such that the sheet P is conveyed in the sheet conveyance direction C while being adsorbed or attracted onto the conveyor belts 45, 55. On this occasion, the controller 100 controls the ink-jet head 2*a* to eject the ink when a predetermined time has elapsed after detection of the leading end of the sheet P by the sheet sensor 8, namely, when the sheet P passes a region at which the sheet P is opposed to the ink-jet head 2*a*. Further, the controller 100 controls the ink-jet heads 2*b* to eject the ink of the mutually different colors when a predetermined time has elapsed after detection of the leading end of the sheet P by the sheet sensor 8, namely, when the sheet P passes a region at which the sheet P is opposed to the ink-jet heads 2*b*. In this way, a color image is formed at a desired position of the front surface of the sheet P.

The controller 100 subsequently controls the feed roller pairs 72, 73 such that the sheet P is conveyed from the conveyor belt 55 toward the discharged-sheet receiving portion 5 through the sheet guides 71*a*, 71*b*. When the trailing end of the sheet P is detected by the sheet sensor 79, the controller 100 controls the feed roller pairs 72, 73 such that the rollers of each of the feed roller pairs 72, 73 are rotated in the respective reverse rotational directions opposite to the above-indicated predetermined rotational directions.

The controller 100 next controls the three feed roller pairs 74-76 such that the sheet P is conveyed to the feed roller pair 16 through the sheet guides 77*a*-77*c*, 78. The sheet P thus conveyed to the feed roller pair 16 has a posture in which its front surface on which the color image has been formed faces downward while its back surface on which another color image is to be formed faces upward. That is, the sheet P is turned over. The sheet P is conveyed again to the conveying mechanism 40 in this state.

Thereafter, the controller 100 controls the ink-jet heads 2*a*, 2*b* in a manner similar to that when the image was formed on the front surface of the sheet P, so that a desired color image is formed on the back surface of the sheet P. The controller 100 then controls the feed roller pairs 72, 73 such that the sheet P on which the respective color images have been formed on the front surface and the back surface is discharged to the discharged-sheet receiving portion 5. Thus, the duplex color printing operation on the sheet P is finished.

There will be next explained the duplex monochrome printing operation. When print data for forming monochrome images on both sides (i.e., both of the front and the back surfaces) of the sheet P is sent from the PC or the like to the controller 100, the controller 100 controls the sheet supply unit 10 and the feed roller pair 16 to supply the sheet P from the sheet cassette 11 to the conveying mechanism 40 through the sheet guides 15*a*, 15*b*.

Figure 4:
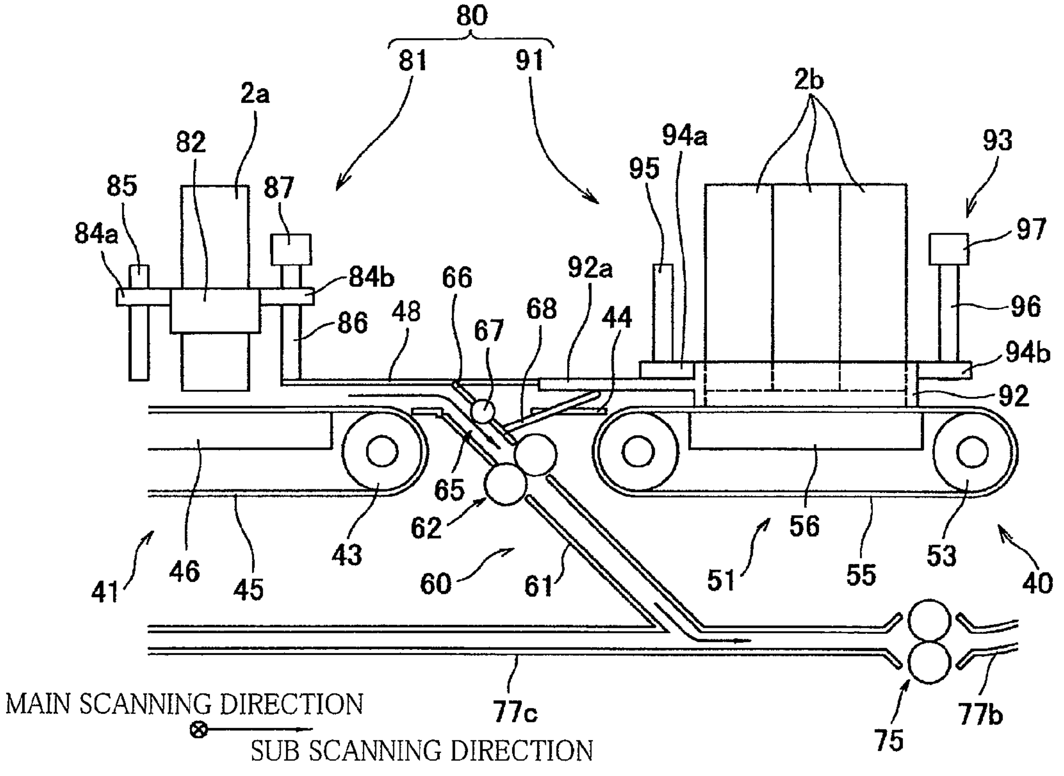
FIG. 4 is a partial side view of the ink-jet printer shown in FIG. 1, showing a state in which downstream-side three of the four ink-jet heads are capped by the maintenance unit.

On this occasion, the controller 100 controls the motor 97 to move the second sleeve 92 from the retracted position to the contact position, as shown in FIG. 4A. The movement of the second sleeve 92 causes the guide member 66 of the path changing mechanism 65 that was kept in the horizontal posture to be inclined, so that the sheet P conveyed by the first unit 41 can be sent or conveyed to the bypass path so as to bypass the second position at which the sheet P is opposed to the ink-jet heads 2*b* for color printing. Further, the ink-jet heads 2*b* that do not contribute to the current monochrome printing operation can be capped by utilizing the second sleeve 92, thereby restraining the thickening of the ink in the neighborhood of the ejection openings 4*a* of the heads 2*b*.

The controller 100 then controls the conveying mechanism 40 such that the sheet P is conveyed in the sheet conveyance direction C while being adsorbed or attracted onto the conveyor belt 45. On this occasion, the controller 100 controls the ink-jet head 2*a* to eject the ink when a predetermined time has elapsed after detection of the leading end of the sheet P by the sheet sensor 8, namely, when the sheet P passes the region at which the sheet P is opposed to the ink-jet head 2*a*. In this way, a monochrome image is formed at a desired position of the front surface of the sheet P.

The controller 100 then controls the feed roller pairs 62, 72-75 such that the rollers of each of the feed roller pairs 62, 72-75 are rotated in respective predetermined rotational directions, so as to permit the sheet P on which the monochrome image has been formed to be conveyed toward the discharged-sheet receiving portion 5 through the bypass path. When the trailing end of the sheet P is detected by the sheet sensor 79, the controller 100 controls the feed roller pairs 72-75 such that the rollers of each of the feed roller pairs 72-75 are rotated in respective reverse rotational directions opposite to the above-indicated predetermined rotational directions. On this occasion, the feed roller pair 76 is also controlled so as to permit the sheet P to be conveyed to the feed roller pair 16 through the sheet guides 77*c*, 78. It is noted that the rollers of the feed roller pair 62 are kept rotated in the above-indicated respective predetermined rotational directions.

The sheet P thus conveyed to the feed roller pair 16 has a posture in which its front surface on which the monochrome image has been formed faces downward while its back surface on which another monochrome image is to be formed faces upward. That is, the sheet P is turned over. The sheet P is conveyed by the feed roller pair 16 again to the conveying mechanism 40 in this state. Thereafter, the controller 100 controls the ink-jet head 2*a* in a manner similar to that when the image was formed on the front surface of the sheet P, so that a desired monochrome image is formed on the back surface of the sheet P. The controller 100 then controls the feed roller pairs 62, 72-75 such that the sheet P on which the respective monochrome images have been formed on the front surface and the back surface is discharged to the discharged-sheet receiving portion 5. After the sheet P has been discharged to the discharged-sheet receiving portion 5, the controller 100 controls the motor 97 to move the second sleeve 92 from the contact position to the retracted position. The movement of the second sleeve 92 causes the guide member 66 of the path changing mechanism 65 that was kept in the inclined posture to be horizontal. In this way, the duplex monochrome printing operation on the sheet P is finished.

For forming a color image on the front surface of the sheet P and a monochrome image on the back surface thereof, the controller 100 controls the motor 97 to move the second sleeve 92 from the retracted position to the contact position when the trailing end of the sheet P is detected by the sheet sensor 79 after the color image has been formed on the front surface of the sheet P as described above. Subsequently, the monochrome image is formed on the back surface of the sheet P that has been conveyed back again to the conveying mechanism 40 through the return path, and the sheet P is finally discharged to the discharged-sheet receiving portion 5 through the bypass path.

For forming a monochrome image on the front surface of the sheet P and a color image on the back surface thereof, the controller 100 controls the motor 97 to move the second sleeve 92 from the contact position to the retracted position when the trailing end of the sheet P is detected by the sheet sensor 79 after the monochrome image has been formed on the front surface of the sheet P as described above. Subsequently, the color image is formed on the back surface of the sheet P that has been conveyed back again to the conveying mechanism 40 through the return path, and the sheet P is finally discharged to the discharged-sheet receiving portion 5.

There will be next explained a maintenance operation conducted by the maintenance unit 80 for recovering ejection performance of each of the ink-jet heads 2*a*, 2*b*.

When the color image is formed on the sheet P, the sheet P passes both of the first position at which the sheet P is opposed to the ink-jet head 2*a* and the second position at which the sheet P is opposed to the ink-jet heads 2*b*. Accordingly, foreign substances risen or swirled during the passage of the sheet P through those positions may adhere to the ejection surfaces 3*a*, 3*b*. In an instance where the foreign substances adhere to the ejection surfaces 3*a*, 3*b* in particular, to the ejection openings 4*a*, the ink-jet heads 2*a*, 2*b* may suffer from unstable ink ejection or ink ejection failure. In this instance, the ejection performance of each of the ink-jet heads 2*a*, 2*b* needs to be recovered. In view of this, after the color image has been formed on the sheet P, the controller 100 controls the motors 87, 97 to move the first and second sleeves 82, 92 to the respective contact positions. After the ink has been purged from the ink-jet heads 2*a*, 2*b*, the controller 100 controls the motors 87, 97 to move the first and second sleeves 82, 92 to the respective retracted positions. Subsequently, the controller 100 controls the wiper mechanism to wipe the ejection surfaces 3*a*, 3*b* to remove the ink and the foreign substances adhering thereto. In this way, the maintenance operation for recovering the ejection performance of the ink-jet heads 2*a*, 2*b* is finished. The ink adhered to the conveyor belts 45, 55 as a result of the ink purging from the heads 2*a*, 2*b* is removed by the cleaning member.

On the other hand, when the monochrome image is formed on the sheet P, the sheet P passes through the bypass path. Accordingly, the foreign substances such as paper dust do not tend to adhere to the ejection surfaces 3*b* of the ink-jet heads 2*b* for color printing. Further, because the ink-jet heads 2*b* are capped by utilizing the second sleeve 92, the foreign substances are hard to adhere to the ejection surfaces 3*b*. Accordingly, the maintenance operation need not be performed on the three ink-jet heads 2*b* after the monochrome printing operation.

In other words, after the monochrome image has been formed on the sheet P, the controller 100 controls only the motor 87 to move the first sleeve 82 to the contact position, and the ink is purged from the ink-jet head 2*a*. In this instance, because the second sleeve 92 has been kept placed at the contact position since the prior monochrome printing operation and therefore the foreign substances do not adhere to the ejection surfaces 3*b*, the ink is not purged from the ink-jet heads 2*b*. Thereafter, the controller 100 controls the motor 87 to move the first sleeve 82 to the retracted position and controls the wiper mechanism to wipe the ejection surface 3*a* of the ink-jet head 2*a* to remove the ink and the foreign substances adhering thereto. Thus, the maintenance operation for recovering the ejection performance of the ink-jet head 2*a* is finished. According to the arrangement, the ink purging from the three ink-jet heads 2*b* is not conducted after the printing of the monochrome image on the sheet P, thereby avoiding ink consumption by the purging. It is therefore possible to restrain ink consumption with higher reliability.

As explained above, in the ink-jet printer 1 according to the present embodiment, when the monochrome printing operation is performed on the sheet P, namely, when the printing is conducted by ink ejection only from the ink-jet head 2*a*, the sheet P is conveyed through the bypass path so as to bypass the second position in the conveyance path at which the sheet P is opposed to the ink-jet heads 2*b*. Accordingly, the foreign substances are less likely to adhere to the ink-jet heads 2*b*. Consequently, it is possible to restrain ink consumption by the maintenance of the ink-jet heads 2*b*, namely, by the ink purging from the ink-jet heads 2*b*.

The ink-jet printer 1 according to the present embodiment is equipped with the second capping mechanism 91, whereby the ink-jet heads 2*b* need not be moved when the ink-jet heads 2*b* are capped. Accordingly, it is not necessary to secure a space into which the ink-jet heads 2*b* are moved for capping, thereby downsizing the printer 1 and simplifying the structure of the second moving mechanism 93, as compared with a structure for moving the ink-jet heads 2*b*.

In the ink-jet printer 1 according to the illustrated embodiment, the second sleeve 92 is disposed at the position at which the external space communicating with the ejection openings 4*a* of the ink-jet heads 2*b* becomes the hermetically closed space, when the path changing mechanism 65 permits the sheet P to be conveyed through the bypass path. Accordingly, it is possible to restrain thickening of the ink in the neighborhood of the ejection openings of the ink-jet heads 2*b*. Further, owing to the path changing mechanism 65, the path through which the sheet P is to be conveyed is automatically changed between the two paths, i.e., the conveyance path and the bypass path, interlocking with the movement of the second sleeve 92. Accordingly, it is not needed to provide any controller for changing the paths.

In the ink-jet printer 1 according to the illustrated embodiment, the rollers of the feed roller pair 16 that also function as the register rollers are disposed on the upstream side of the conveying mechanism 40, and the first unit 41 and the second unit 51 are disposed so as to be arranged in the horizontal direction along the sheet conveyance direction C, namely, the first position of the conveyance path at which the sheet is opposed to the head 2*a* and the second position of the conveyance path at which the sheet is opposed to the heads 2*b* are arranged in the horizontal direction. Accordingly, the sheet is less likely to skew between those positions. Therefore, it is not necessary to provide other register rollers between the first and second units 41, 51.

In the ink-jet printer 1 according to the illustrated embodiment, the ejection region 4*b* of each ink-jet head 2*a*, 2*b* has a larger dimension as measured in the main scanning direction than the dimension of the sheet P as measured in the same direction. Accordingly, it is possible to print images, characters, and the like on the sheet P without moving the ink-jet heads 2*a*, 2*b* in the main scanning direction.

In the ink-jet printer 1 according to the illustrated embodiment, the discharged-sheet receiving portion 5, the four ink-jet heads 2*a*, 2*b*, the conveying mechanism 40, and the bypass conveying mechanism 60 and the sheet supply unit 10 are arranged in this order in the direction from the upper portion of the printer 1 toward the lower portion thereof. In the ink-jet printer 1 of the illustrated embodiment, those components may be transversely disposed. In this case, the discharged-sheet receiving portion 5, the four ink-jet heads 2*a*, 2*b*, the conveying mechanism 40, and the bypass conveying mechanism 60 and the sheet supply unit 10 are disposed in the horizontal direction. That is, in the thus structured ink-jet printers, the discharged-sheet receiving portion 5, the four ink-jet heads 2*a*, 2*b*, the conveying mechanism 40, and the bypass conveying mechanism 60 and the sheet supply unit 10 are disposed so as to be arranged in one direction.

Second Embodiment

Figure 5:
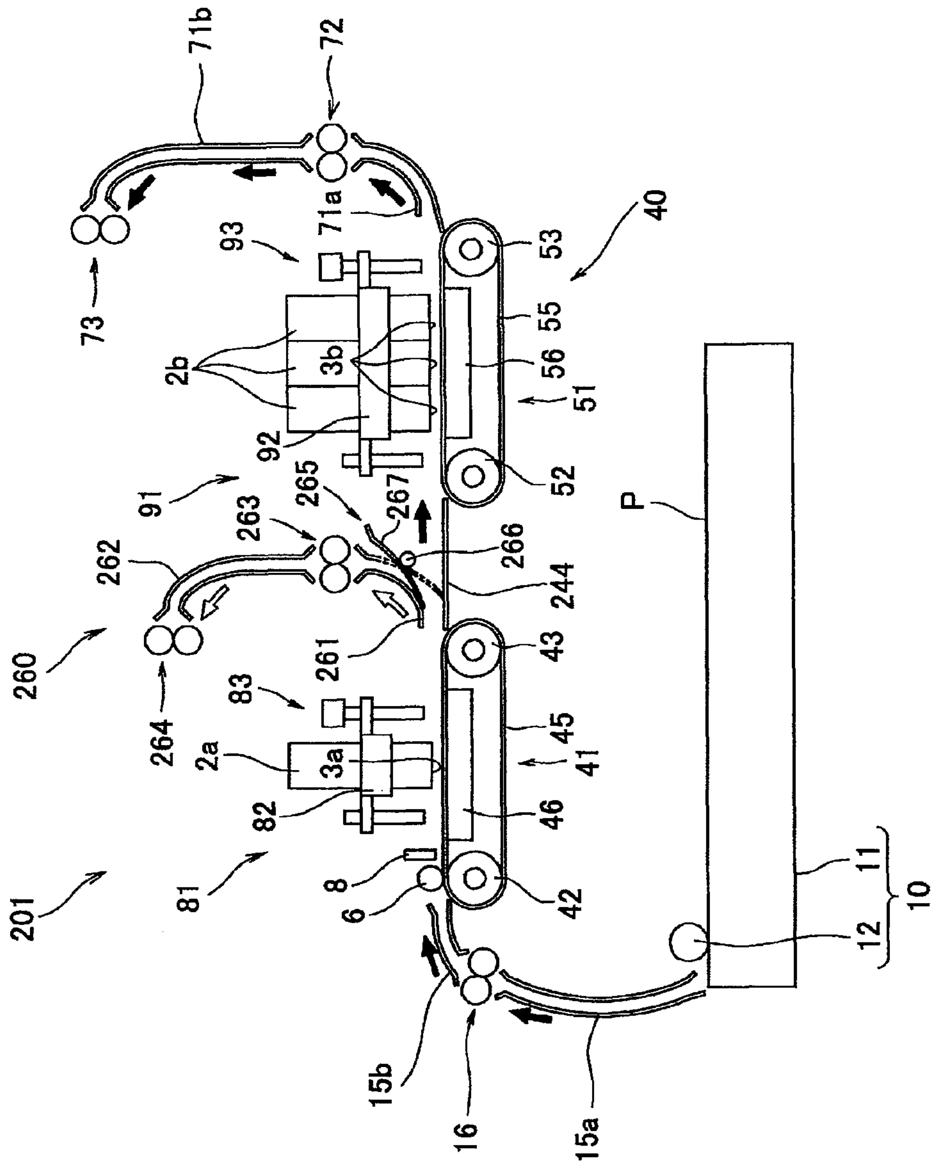
FIG. 5 is a side view in cross section schematically showing an internal structure of an ink-jet printer according to a second embodiment of the invention.

Referring next to FIG. 5, there will be explained an ink-jet printer 201 according to a second embodiment of the invention.

In the ink-jet printer 201 of the second embodiment, the return mechanism 70 is not provided, and a bypass conveying mechanism 260 and a path changing mechanism 265 are disposed between the ink-jet head 2*a* and the ink-jet heads 2*b*. The same reference numerals as used in the illustrated first embodiment are used to identify the corresponding components in the second embodiment, and a detailed explanation of which is dispensed with. The sheet guide 71*a* shown in FIG. 5 partly differs in shape from that of the first embodiment because the return mechanism 70 is not provided in the printer 201. However, the same reference numeral as used in the first embodiment is used because the shape of the sheet guide 71*a* of the printer 201 is substantially similar to the shape of the sheet guide 71*a* of the printer 1.

The bypass conveying mechanism 260 includes sheet guides 261, 262 which extend, in a curved form, upward from the substantially middle position of the conveyance path, and two feed roller pairs 263, 264. The bypass conveying mechanism 260 defines a bypass path indicated by bold arrows (white open arrows) in FIG. 5. The bypass path branches from the conveyance path at a portion thereof, i.e., at the substantially middle position thereof between a first position at which the sheet P is opposed to the ink-jet head 2*a* and a second position at which the sheet P is opposed to the ink-jet heads 2*b*, and is connected to the discharged-sheet receiving portion 5. In this embodiment, the bypass path is connected directly to the discharged-sheet receiving portion 5. One of two rollers of each of the feed roller pairs 263, 264 is configured to rotate by a feed motor (not shown) controlled by the controller 100 while the other roller is a driven roller configured to rotate in accordance with the rotation of the one roller. The feed roller pair 264 is disposed at a middle of the discharged-sheet receiving portion 5 in the sub scanning direction. Accordingly, the sheet P fed by the feed roller pair 264 is discharged to the discharged-sheet receiving portion 5.

The path changing mechanism 265 includes a shaft 266, a guide member 267 which is fixed to the outer surface of the shaft 266 and which cooperates with the sheet guide 261 to partially define the bypass path, and a motor (not shown) controlled by the controller 100 and configured to rotate the shaft 266. A plate-like guide member 244 is disposed between the first and second units 41, 51, in place of the guide member 44 in the illustrated first embodiment.

In the structure described above, a color image is formed on the sheet P in a manner similar to that in the illustrated first embodiment. More specifically, the controller 100 controls the sheet supply unit 10, the three feed roller pairs 16, 72, 73, the conveying mechanism 40, and the four ink-jet heads 2*a*, 2*b*, such that the color image is formed on the sheet P conveyed from the sheet supply unit 10 to the conveying mechanism 40 along bold arrows (black solid arrows) in FIG. 5, and the sheet P on which the color image has been formed is discharged to the discharged-sheet receiving portion 5. On this occasion, the guide member 267 of the path changing mechanism 265 is located at a closed position at which one end of the guide member 267 is in contact with the sheet guide 261 so as to close the bypass path.

On the other hand, a monochrome image is formed in the following manner. The controller 100 controls the path changing mechanism 265 to rotate the shaft 266 such that the guide member 267 is swung so as to be located at an open position at which the above-indicated one end of the guide member 267 is in contact with the guide member 244 so as to open the bypass path. The controller 100 further controls the sheet supply unit 10, the three feed roller pairs 16, 263, 264, the first unit 41 of the conveying mechanism 40, and the ink-jet head 2*a*, such that the monochrome image is formed on the sheet P conveyed from the sheet supply unit 10 to the first unit 41, and the sheet P on which the monochrome image has been formed is discharged to the discharged-sheet receiving portion 5 through the bypass path. As in the illustrated first embodiment, the three ink-jet heads 2*b* may be capped by utilizing the second sleeve 92 when the monochrome image is formed on the sheet P, in the present embodiment.

As in the ink-jet printer 1 of the illustrated first embodiment, in the ink-jet printer 201 of the second embodiment, the sheet P is conveyed through the bypass path so as to bypass the second position of the conveyance path at which the sheet P is opposed to the ink-jet heads 2*b*, when the monochrome image is formed on the sheet P. Accordingly, the foreign substances are less likely to adhere to the ink-jet heads 2*b*. Consequently, it is possible to restrain ink consumption by the maintenance of the ink-jet heads 2*b*, namely, by the purging from the ink-jet heads 2*b*. It is noted that the same effects as obtained in the illustrated first embodiment can be obtained in the second embodiment for the same structure as the first embodiment.

Third Embodiment

Figure 6:
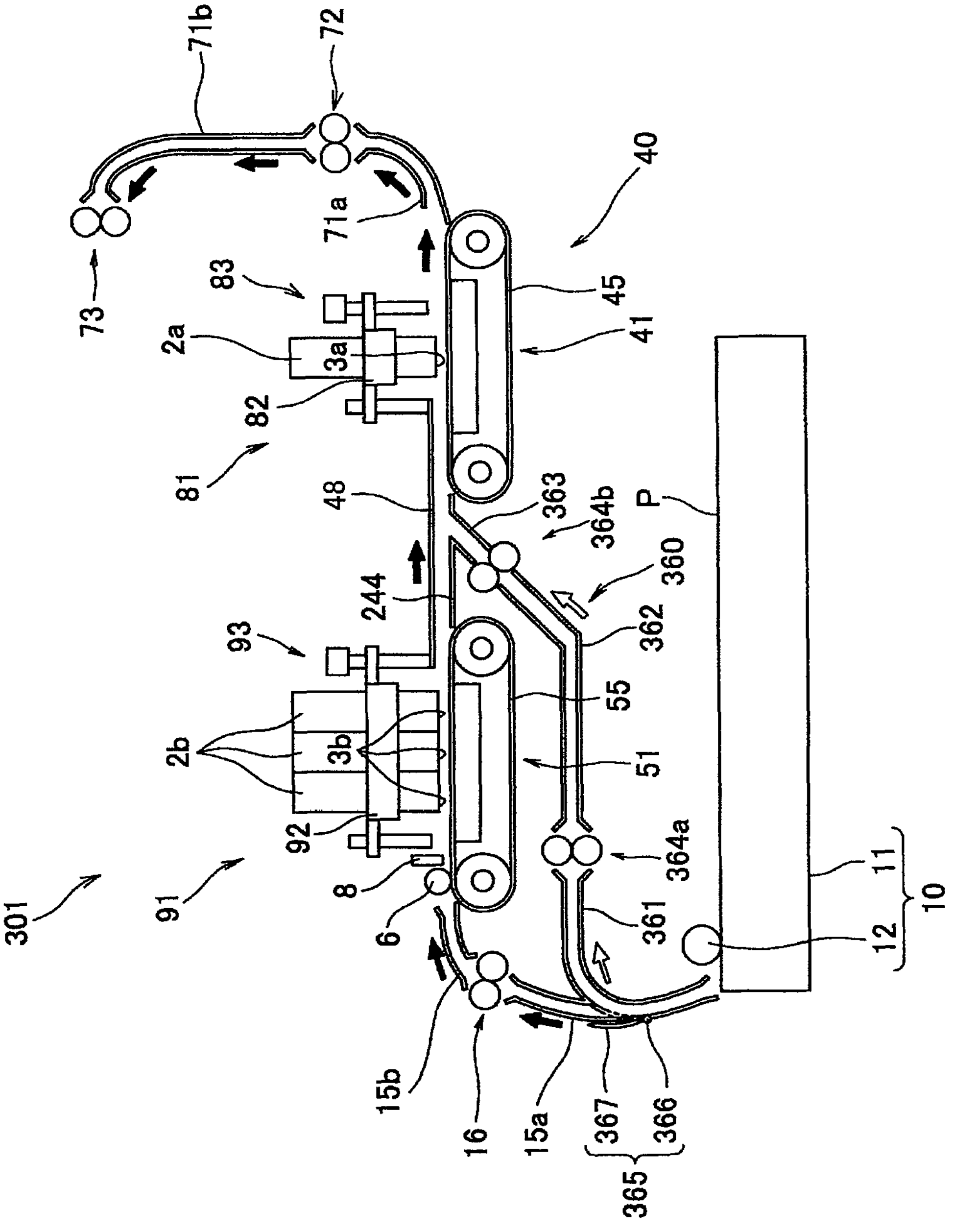
FIG. 6 is a side view in cross section schematically showing an internal structure of an ink-jet printer according to a third embodiment of the invention.

With reference to FIG. 6, there will be explained an ink-jet printer 301 according to a third embodiment of the invention.

Like the ink-jet printer 201 of the illustrated second embodiment, the ink-jet printer 301 of the third embodiment is not equipped with the return mechanism 70, and a bypass conveying mechanism 360 and a path changing mechanism 365 are disposed around the second unit 51. As in the illustrated embodiments, the ink-jet head 2*a* and the first capping mechanism 81 are disposed so as to be opposed to the first unit 41 while the ink-jet heads 2*b* and the second capping mechanism 91 are disposed so as to be opposed to the second unit 51. In the third embodiment, however, the position, i.e., the first position, at which the sheet P is opposed to the ink-jet head 2*a* and the position, i.e., the second position, at which the sheet P is opposed to the ink-jet heads 2*b* are opposite in the sheet conveyance direction with respect to the first position and the second position in the illustrated first and second embodiments. The same reference numerals as used in the illustrated first and second embodiments are used to identify the corresponding components in the third embodiment, and a detailed explanation of which is dispensed with.

The bypass conveying mechanism 360 includes: three sheet guides 361-363 which extend continuously from the middle of the sheet guide 15*a* and merge with the conveyance path at a substantially middle position of the conveyance path; and two feed roller pairs 364*a*, 364*b*. The bypass conveying mechanism 360 defines a bypass path indicated by bold arrows (white open arrows) in FIG. 6. The bypass path branches from a portion of the sheet supply path defined by the sheet guide 15*a* and merges with the conveyance path between the first position at which the sheet P is opposed to the ink-jet head 2*a* and the second position at which the sheet P is opposed to the ink-jet heads 2*b*. One of two rollers of each of the feed roller pairs 364*a*, 364*b* is configured to rotate by a feed motor (not shown) controlled by the controller 100 while the other roller is a driven roller configured to rotate in accordance with the rotation of the one roller. Further, like the rollers of the feed roller pair 16, the rollers of the feed roller pair 364*b* function as register rollers for correcting skew of the sheet P.

The path changing mechanism 365 includes a shaft 366, a curved guide member 367 which is fixed to the outer surface of the shaft 366 and which is capable of protruding into the sheet guide 15*a*, and a motor (not shown) controlled by the controller 100 and configured to rotate the shaft 366.

When a color image is formed on the sheet P in the structure described above, the controller 100 controls the sheet supply unit 10, the three feed roller pairs 16, 72, 73, the conveying mechanism 40, and the four ink-jet heads 2*a*, 2*b*, such that the color image is formed on the sheet P conveyed from the sheet supply unit 10 to the conveying mechanism 40 along bold arrows (black solid arrows) in FIG. 6, and the sheet P on which the color image has been formed is discharged to the discharged-sheet receiving portion 5. On this occasion, the guide member 367 of the path changing mechanism 365 is located at a retracted position at which the guide member 367 does not protrude into the sheet guide 15*a*.

When a monochrome image is formed on the sheet P, on the other hand, the controller 100 controls the path changing mechanism 365 to rotate the shaft 366 such that the guide member 367 is swung so as to be located at a protruding position at which the guide member 367 protrudes into the sheet guide 15*a*. The controller 100 further controls the sheet-supply unit 10, the four feed roller pairs 364*a*, 364*b*, 72, 73, the first unit 41 of the conveying mechanism 40, and the ink-jet head 2*a*, such that the monochrome image is formed on the sheet P conveyed from the sheet supply unit 10 to the first unit 41 through the bypass path, and the sheet P on which the monochrome image has been formed is discharged to the discharged-sheet receiving portion 5. As in the illustrated first embodiment, the three ink-jet heads 2*b* may be capped by utilizing the second sleeve 92 when the monochrome image is formed on the sheet P.

As in the ink-jet printer 1 of the illustrated first embodiment, in the ink-jet printer 301 of the third embodiment, the sheet P is conveyed through the bypass path so as to bypass the second position of the conveyance path at which the sheet P is opposed to the ink-jet heads 2*b*, when the monochrome image is formed on the sheet P. Accordingly, the foreign substances are less likely to adhere to the ink-jet heads 2*b*. Consequently, it is possible to restrain ink consumption by the maintenance of the ink-jet heads 2*b*, namely, by the purging from the ink-jet heads 2*b*. It is noted that the same effects as obtained in the illustrated first and second embodiments can be obtained in the third embodiment for the same structure as the first and second embodiments.

While the presently preferred embodiments of the invention have been explained, it is noted that the invention is not limited to the details of the illustrated embodiments, but may be embodied with various changes and modifications, which may occur to those skilled in the art, without departing from the spirit and scope of the invention defined in the attached claims.

For instance, the maintenance unit 80 of the first through the third embodiments may be eliminated. Where the maintenance unit 80 is eliminated in the first embodiment, there may be provided a motor which is controlled by the controller 100 and which can rotate the rotation shafts 67 of the path changing mechanism 65, and the controller 100 may be configured to directly control the path changing mechanism 65 for permitting the sheet P to be conveyed to the bypass path or the conveyance path. In this instance, the same effect as in the illustrated first embodiment can be obtained. In addition, it is not necessary to provide the protruding portion 92*a* and the lever 68.

The first position at which the sheet P is opposed to the ink-jet head 2*a* and the second position at which the sheet P is opposed to the ink-jet heads 2*b* may not be arranged in the horizontal direction.

The sheet supply unit (sheet supply portion) and the discharged-sheet receiving portion may be disposed so as to sandwich the conveying mechanism 40 therebetween in the horizontal direction. Alternatively, only one of the sheet supply unit and the discharged-sheet receiving portion may be disposed so as to be aligned with the conveying mechanism 40 in the horizontal direction.

The return path may be formed below the sheet supply unit 10.

Other register rollers different from the rollers of the feed roller pair 16 may be provided on the upstream side of the conveying mechanism 40.

What is claimed is:

1. An ink-jet recording apparatus, comprising:

a first recording head and a second recording head each having a plurality of ejection openings from which ink is ejected;

a conveying mechanism which defines a conveyance path through which a recording medium is conveyed so as to pass a first position at which the recording medium is opposed to the ejection openings of the first recording head and a second position at which the recording medium is opposed to the ejection openings of the second recording head; and a bypass conveying mechanism which defines a bypass path that is connected to the conveyance path at a position thereof between the first position and the second position, for permitting the recording medium to be conveyed so as to bypass the second position.

2. The ink-jet recording apparatus according to claim 1, further comprising a capping mechanism which is configured to selectively establish: a state in which a hermetically closed space is formed at a front of a surface of the second recording head in which the ejection openings are formed; and a state in which the hermetically closed space is not formed, the capping mechanism being configured to cap the second recording head in the state in which the hermetically closed space is formed.

3. The ink-jet recording apparatus according to claim 2,
wherein the conveying mechanism includes a conveyor belt which is opposed to the second recording head and by which the recording medium is conveyed to the second position, and
wherein the capping mechanism includes: a sleeve disposed around the second recording head so as to surround the second recording head; and a moving mechanism configured to move the sleeve selectively between a contact position at which the sleeve is held in close contact with the conveyor belt and a retracted position at which the sleeve is spaced apart from the conveyor belt.

4. The ink-jet recording apparatus according to claim 2, further comprising a path changing mechanism configured to permit the recording medium to pass through the bypass path,
wherein the capping mechanism is configured to establish the state in which the hermetically closed space is formed, when the path changing mechanism permits the recording medium to pass through the bypass path.

5. The ink-jet recording apparatus according to claim 1, wherein the conveyance path is defined by the conveying mechanism such that the first position and the second position are located so as to be arranged in a horizontal direction along a medium conveyance direction in which the recording medium is conveyed.

6. The ink-jet recording apparatus according to claim 1, further comprising a register roller disposed on an upstream side of the conveying mechanism and configured to correct skew of the recording medium.

7. The ink-jet recording apparatus according to claim 1, further comprising a reverse conveying mechanism which defines a return path and which is configured to reverse a direction of conveyance of the recording medium that has been conveyed thereto by the conveying mechanism and subsequently send the recording medium again to the conveying mechanism through the return path,
wherein a part of the bypass path defined by the bypass conveying mechanism and a part of the return path defined by the reverse conveying mechanism are common to each other.

8. The ink-jet recording apparatus according to claim 1, wherein the first recording head is configured to eject black ink while the second recording head is configured to eject colored ink whose color is other than black.

9. The ink-jet recording apparatus according to claim 1,
wherein each of the first recording head and the second recording head has an ejection region in which the ejection openings are formed, and
wherein the ejection region has a dimension not smaller than a dimension of the recording medium, the dimensions being measured in a direction perpendicular to a medium conveyance direction in which the recording medium is conveyed.

10. The ink-jet recording apparatus according to claim 1, wherein the first recording head, the second recording head, the conveying mechanism, and the bypass conveying mechanism are disposed so as to be arranged in one direction.

11. The ink-jet recording apparatus according to claim 10, further comprising; a medium supply portion configured to accommodate the recording medium and to supply the recording medium to the conveying mechanism; and a discharged-medium receiving portion configured to receive the recording medium conveyed from the conveying mechanism,
wherein the discharged-medium receiving portion, the first recording head, the second recording head, the conveying mechanism, the bypass conveying mechanism, and the medium supply portion are disposed so as to be arranged in the one direction.

12. The ink-jet recording apparatus according to claim 1,
wherein the first recording head is configured to eject black ink while the second recording head is configured to eject colored ink whose color is other than black,
wherein the apparatus further comprises: a maintenance unit configured to conduct a maintenance operation on the first recording head and the second recording head for recovering ejection performance thereof and a controller configured to control the maintenance unit, and
wherein the controller is configured to control the maintenance unit to conduct the maintenance operation on the first recording head and the second recording head after a colored image has been recorded on the recording medium and to conduct the maintenance operation on only the first recording head after a monochrome image has been recorded on the recording medium.

13. The ink-jet recording apparatus according to claim 1,
wherein the conveyance path is defined by the conveying mechanism such that the first position and the second position are located so as to be arranged in this order along a medium conveyance direction in which the recording medium is conveyed, and
wherein the bypass path branches from the conveyance path at a position thereof between the first position and the second position and merges with the conveyance path on a downstream side of the second position.

14. The ink-jet recording apparatus according to claim 1, further comprising a discharged-medium receiving portion configured to receive the recording medium conveyed from the conveying mechanism,
wherein the conveyance path is defined by the conveying mechanism such that the first position and the second position are located so as to be arranged in this order along a medium conveyance direction in which the recording medium is conveyed, and
wherein the bypass path branches from the conveyance path at a position thereof between the first position and the second position and is connected to the discharged-medium receiving portion.

15. The ink-jet recording apparatus according to claim 1, further comprising a medium supply portion configured to accommodate the recording medium and to supply the recording medium to the conveying mechanism,
wherein the conveyance path is defined by the conveying mechanism such that the second position and the first position are located so as to be arranged in this order along a medium conveyance direction in which the recording medium is conveyed, and
wherein the bypass path branches from a path extending from the medium supply portion to an upstream portion of the conveyance path and merges with the conveyance path at a position thereof between the first position and the second position.

* * * * *